(12) United States Patent
Pandey et al.

(10) Patent No.: US 9,154,187 B2
(45) Date of Patent: Oct. 6, 2015

(54) SYSTEM AND METHOD FOR OPERATING A FILTER FOR ECHO CANCELLATION

(71) Applicant: NXP B.V., Eindhoven (NL)

(72) Inventors: Sujan Pandey, Eindhoven (NL); Frits Steenhof, Waalre (NL)

(73) Assignee: NXP B.V., Eindhoven (NL)

( * ) Notice: Subject to any disclaimer, the term of this patent is extended or adjusted under 35 U.S.C. 154(b) by 148 days.

(21) Appl. No.: 13/902,179

(22) Filed: May 24, 2013

(65) Prior Publication Data

US 2014/0348276 A1     Nov. 27, 2014

(51) Int. Cl.
*H04B 3/23* (2006.01)
*H04B 1/10* (2006.01)

(52) U.S. Cl.
CPC .............. *H04B 3/23* (2013.01); *H04B 1/1027* (2013.01)

(58) Field of Classification Search
USPC ................................................. 370/290–291
See application file for complete search history.

(56) References Cited

U.S. PATENT DOCUMENTS

| | | | |
|---|---|---|---|
| 4,621,172 A * | 11/1986 | Kanemasa et al. | 370/291 |
| 5,610,909 A * | 3/1997 | Shaw | 370/291 |
| 2007/0183540 A1 | 8/2007 | Agazzi et al. | |
| 2011/0058667 A1 | 3/2011 | Takada | |

OTHER PUBLICATIONS

Messerschmitt, David G.; "Echo cancellation in speech and data transmission"; IEEE Journal on Selected Areas in Communications; Mar. 1984; pp. 283-297.
Extended European Search Report for European Patent Appln. No. 14160962.8 (Jul. 28, 2014).

* cited by examiner

*Primary Examiner* — Hassan Kizou
*Assistant Examiner* — Ashil Farahmand

(57) ABSTRACT

Systems and methods for operating a filter for echo cancellation are described. In one embodiment, a method for operating a filter for echo cancellation involves monitoring at least one of a filter coefficient of the filter and an echo cancellation error to generate a monitoring result and, in response to the monitoring result, adjusting at least one of delay elements and filter taps of the filter to vary an impulse response of the filter. Other embodiments are also described.

19 Claims, 5 Drawing Sheets

SYSTEM AND METHOD FOR OPERATING A FILTER FOR ECHO CANCELLATION

Embodiments of the invention relate generally to electronic systems and methods and, more particularly, to systems and methods for operating a filter.

When a signal such as a discrete time signal is transmitted over a full duplex communication channel, the received signal will be distorted compared to the transmitted signal, because of near-end echo and far-end echo effects. The signal distortion caused by these echo effects is a common phenomenon in high speed serial communication systems, for example, Universal Serial Bus (USB) systems and Ethernet systems. An echo canceller can be used to reduce or even eliminate the echo from the received symbol. However, the impulse response of the communication channel with echo typically does not remain constant.

An adaptive filter can be used to match the impulse response of the communication channel that varies over time. For example, in some serial communication system, the impulse response of the communication channel may shift in time by more than one period of the baud rate. In order to cope with the variability of channel impulse response, an adaptive filter must be able to perform in the normal, the best case, and the worst case scenarios. In a conventional echo cancellation device, the number of taps of an adaptive filter has to be over dimensioned, such that the adaptive filter can perform under every channel condition. If an echo canceller is dimensioned for the worst channel condition, its adaptive filter need to maintain a large number of filter taps and delay elements. For example, implementing an unnecessary large number of filter taps and delay elements consumes more silicon area, limits possible clock speed and increase power consumption.

Systems and methods for operating a filter for echo cancellation are described. In one embodiment, a method for operating a filter for echo cancellation involves monitoring at least one of a filter coefficient of the filter and an echo cancellation error to generate a monitoring result and, in response to the monitoring result, adjusting at least one of delay elements and filter taps of the filter to vary an impulse response of the filter. Other embodiments are also described. By adjusting the filter in response to the filter coefficient or the echo cancellation error, the impulse response of the filter can be adaptively tuned to the communication channel. Consequently, the filter can be used for a communication channel with varying impulse response.

In one embodiment, a method for operating a filter for echo cancellation involves monitoring at least one of a filter coefficient of the filter and an echo cancellation error to generate a monitoring result and in response to the monitoring result, adjusting at least one of delay elements and filter taps of the filter to vary an impulse response of the filter.

In one embodiment, a system for operating a filter for echo cancellation includes a monitoring module configured to monitor at least one of a filter coefficient of the filter and an echo cancellation error to generate a monitoring result and an adjustment module configured to, in response to the monitoring result, adjust at least one of delay elements and filter taps of the filter to vary an impulse response of the filter.

In one embodiment, a method for operating a filter of a serial communication device for echo cancellation involves comparing an echo cancellation error of the serial communication device with a predefined range, enabling at least one delay element of the filter if the echo cancellation error falls outside of the predefined range, comparing a filter coefficient of the filter with a predefined threshold, and if the filter coefficient is smaller than the predefined threshold, turning off a filter tap of the filter.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
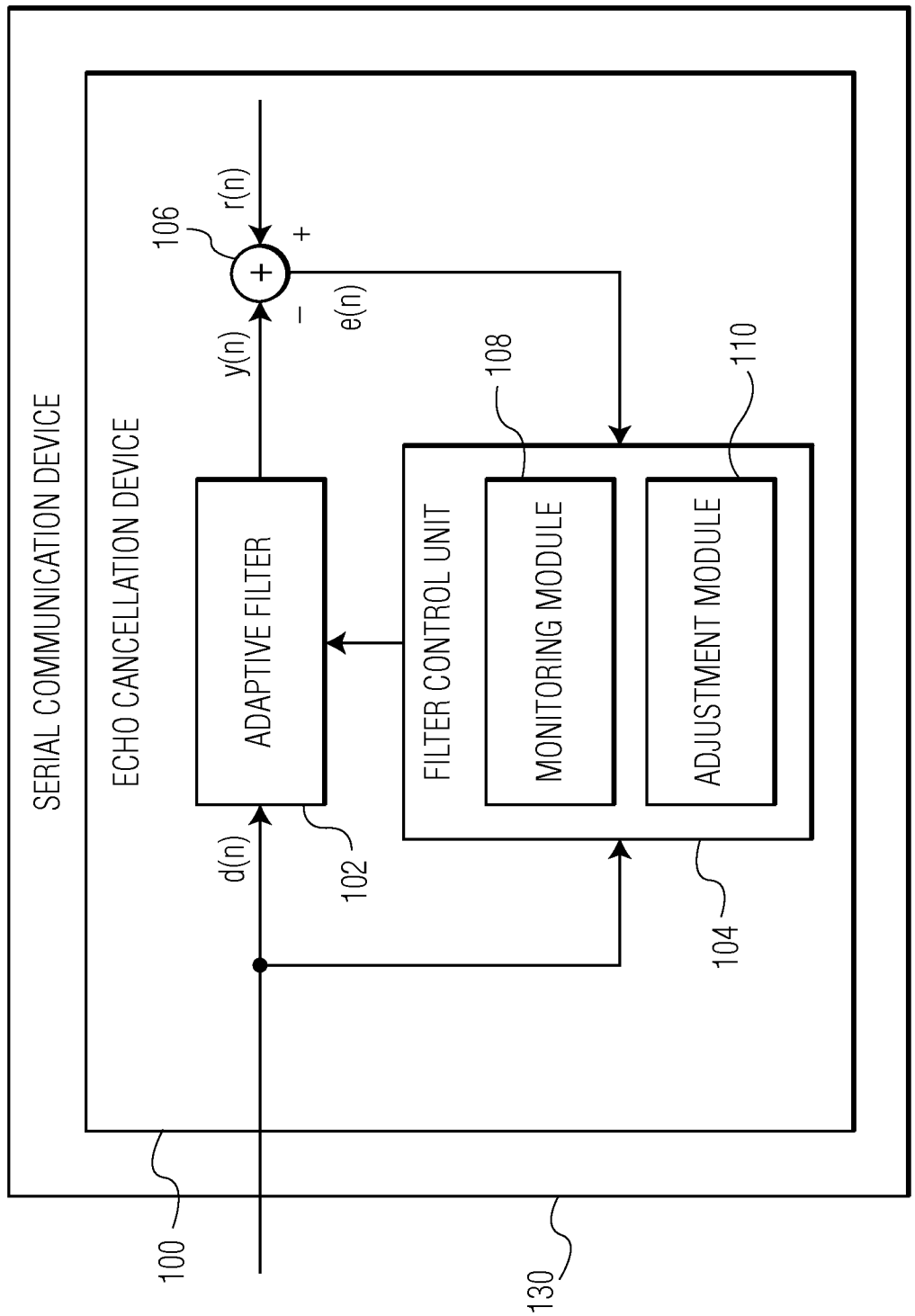
FIG. 1 is a schematic block diagram of an echo cancellation device in accordance with an embodiment of the invention.

FIG. 1 is a schematic block diagram of an echo cancellation device 100 in accordance with an embodiment of the invention. The echo cancellation device can be used for communication channel echo cancellation for various communication systems. In an embodiment, the echo cancellation device is a component of a serial communication device 130 that can send data sequentially over a communication channel. Examples of the serial communication device include, without being limited to, a Universal Serial Bus (USB) device, an Ethernet device, an IEEE 1394 fire wire device and an $I^2C$ device. The serial communication device can be embodied in various physical forms. For example, the serial communication device may be implemented as an Integrated Circuit (IC) chip. In an embodiment, the serial communication device is an automotive Ethernet physical layer (PHY) chip.

The serial communication device 130 can be used for various applications. In an embodiment, the serial communication device is a part of a communication network (not shown) that is used for an automotive application. For example, the communication network facilitates communication among communication devices, such as electronic controller nodes in an automobile system, which may be located within a single vehicle or distributed across multiple vehicles. The communication network may be an in-vehicle network (IVN), for example, a Local Interconnect Network (LIN), a Controller Area Network (CAN) or a FlexRay™ compatible network. A LIN is a vehicle bus system used within automotive network architectures. A CAN is a vehicle bus network designed to allow microcontrollers and devices to communicate with each other within a vehicle without a host computer. A FlexRay™ compatible communication network is a communication network that is designed, developed, manufactured, and/or configured compatibly with or in accordance to the FlexRay™ communication system specifications developed by the FlexRay™ Consortium. A FlexRay™ compatible communication network is a robust, scalable, deterministic and fault-tolerant serial bus network for automotive applications. For example, a FlexRay™ communication system can be used by a car manufacturer to adopt an in-vehicle network (IVN) with increasingly higher data communication speeds to accommodate an increasing number of advanced features in automobiles.

In the embodiment depicted in FIG. 1, the echo cancellation device 100 includes an adaptive filter 102, a filter control unit 104 and a signal processing unit 106. The adaptive filter 102 is used for echo cancellation and to match the impulse response of the communication channel that varies over time. The adaptive filter 102 can be any suitable type of digital/analog filter. For example, the adaptive filter 102 may be a finite impulse response (FIR) filter whose impulse response is of finite duration. In some embodiments described below, the adaptive filter 102 is a digital filter that includes at least one delay element and has at least one filter tap. A delay element is a component that provides a specified delay. In some embodiments, a delay element is implemented as a delay circuit. For example, a delay element may be a digital delay circuit, such as, a digital delay line that allows a signal to be delayed by one or more samples. In the term of z-transform, a delay element that causes a delay of one sample is notated as $Z^{-1}$ and a delay element that causes a delay of N samples is notated as $Z^{-N}$, where N is a positive integer that is larger than one. For a digital filter, such as a FIR filter, the output signal of the digital filter is a weighted sum of the current and previous values of an input signal to the digital filter, which include a signal sample and one or more delayed versions of the signal sample. The current and previous values of the input signal to the digital filter are referred to as the taps of the digital filter. In other words, taps of a digital filter are variations (undelayed/delayed) of the input signal of the digital filter that are included in the output signal of the digital filter. For example, the output signal, y[n], and the input signal, d[n], of a discrete time FIR filter may satisfy:

$$y[n] = \sum_{i=0}^{N} C_i \times d[n-i], \quad (1)$$

where $C_i$ represents filter coefficients, N represents the filter order, d[n−i] represents filter taps, and N is a positive integer. Herein, n represents the signal index of a discrete signal, which is a non-negative integer.

The filter control unit 104 is configured to adjust the adaptive filter 102 to operate in normal, best case, and worst case scenarios. In an embodiment, the filter control unit 104 includes a monitoring module 108 configured to monitor at least one of a filter coefficient of the adaptive filter and an echo cancellation error to generate a monitoring result and, an adjustment module 110 configured to, in response to the monitoring result, adjust at least one delay element or at least one filter tap of the adaptive filter 102 to vary an impulse response of the adaptive filter 102. By adjusting the adaptive filter in response to the filter coefficient or an echo cancellation error, the channel impulse response of the echo cancellation device 100 can be adaptively tuned to the communication channel. Consequently, the adaptive filter 102 can be used for a communication channel with varying impulse response. Compared to a conventional adaptive filter with an unnecessary large number of delay elements and filter taps, the adaptive filter 102 can perform in normal, best case, and worst case scenarios with fewer delay elements and filter taps. In the adaptive filter 102, the delay element or the filter tap that is not needed can be shut down to lower the power consumption. Consequently, compared to a conventional adaptive filter, the adaptive filter 102 can have decreased power consumption, reduced silicon area and can be operated at higher clock speed.

The signal processing unit 106 is configured to derive the echo cancellation error from an output signal of the adaptive filter 102. In the embodiment depicted in FIG. 1, the signal processing unit is implemented as a subtractor. However, in other embodiments, the signal processing unit 106 may be any suitable analog or digital signal processing device. In an embodiment, the adaptive filter 102 estimates a communication channel echo and the signal processing unit 106 calculates the echo cancellation error as the difference between the estimated communication channel echo and an input signal received at the adaptive filter 102. Although the signal processing unit 106 is shown in FIG. 1 as being separate from the adaptive filter 102 and the filter control unit 104, in some embodiments, the signal processing unit 106 is integrated in the adaptive filter 102 or the filter control unit 104.

An example operation of the echo cancellation device 100 is described as follows. An input symbol, d(n), is inputted into the adaptive filter. n represents the signal index, which is a non-negative integer. The input symbol, d(n), is noise free. The adaptive filter outputs an estimated echo, y(n), which is to be subtracted from a received symbol, r(n), at the subtractor 106. The received symbol, r(n), is the sum of echo noise and a transmitted symbol. Echo cancellation error, e(n), is equal to the difference between the estimated echo, y(n), and the received symbol, r(n).

Figure 2:
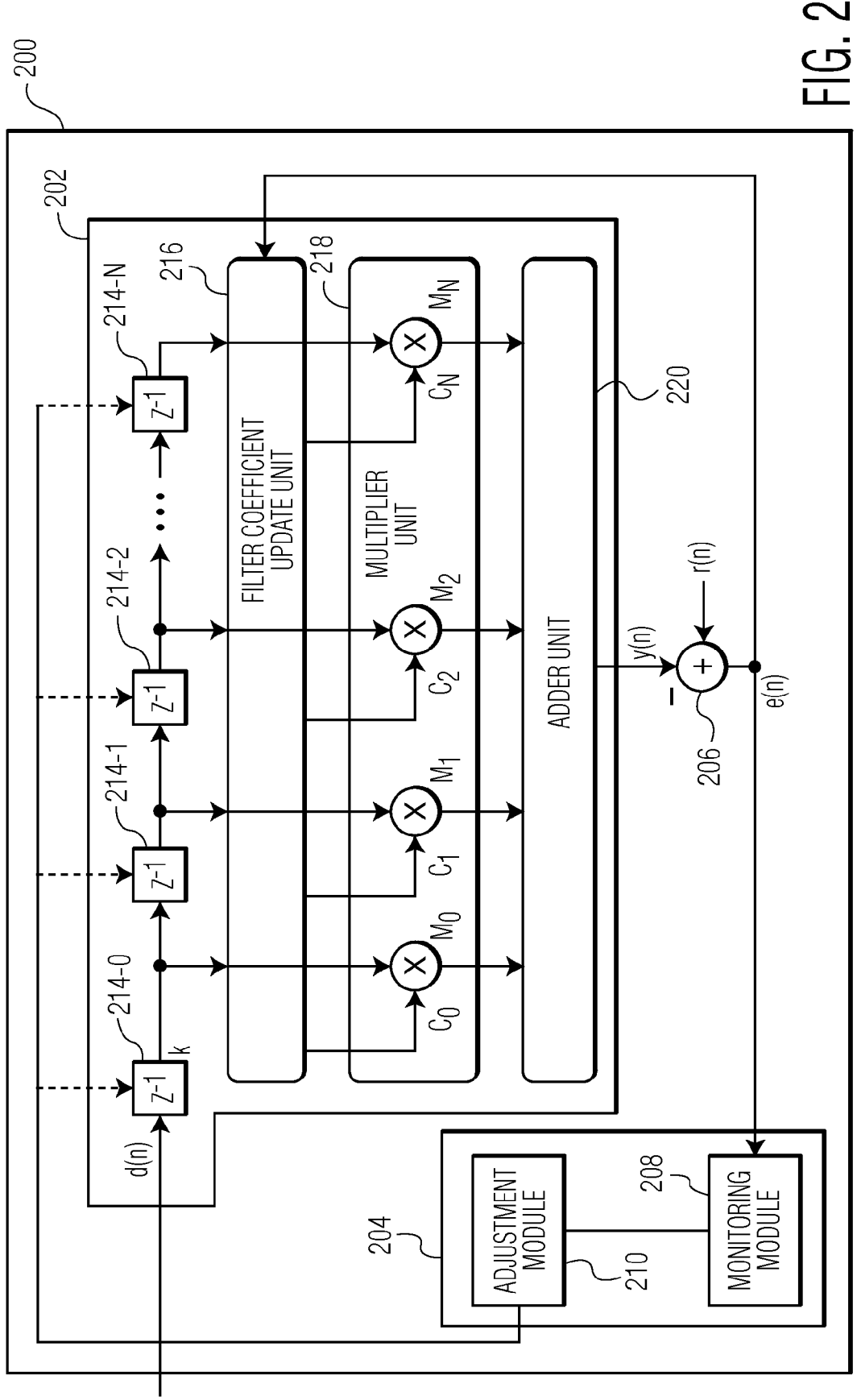
FIG. 2 depicts a first embodiment of the echo cancellation device depicted in FIG. 1.
Figure 3:
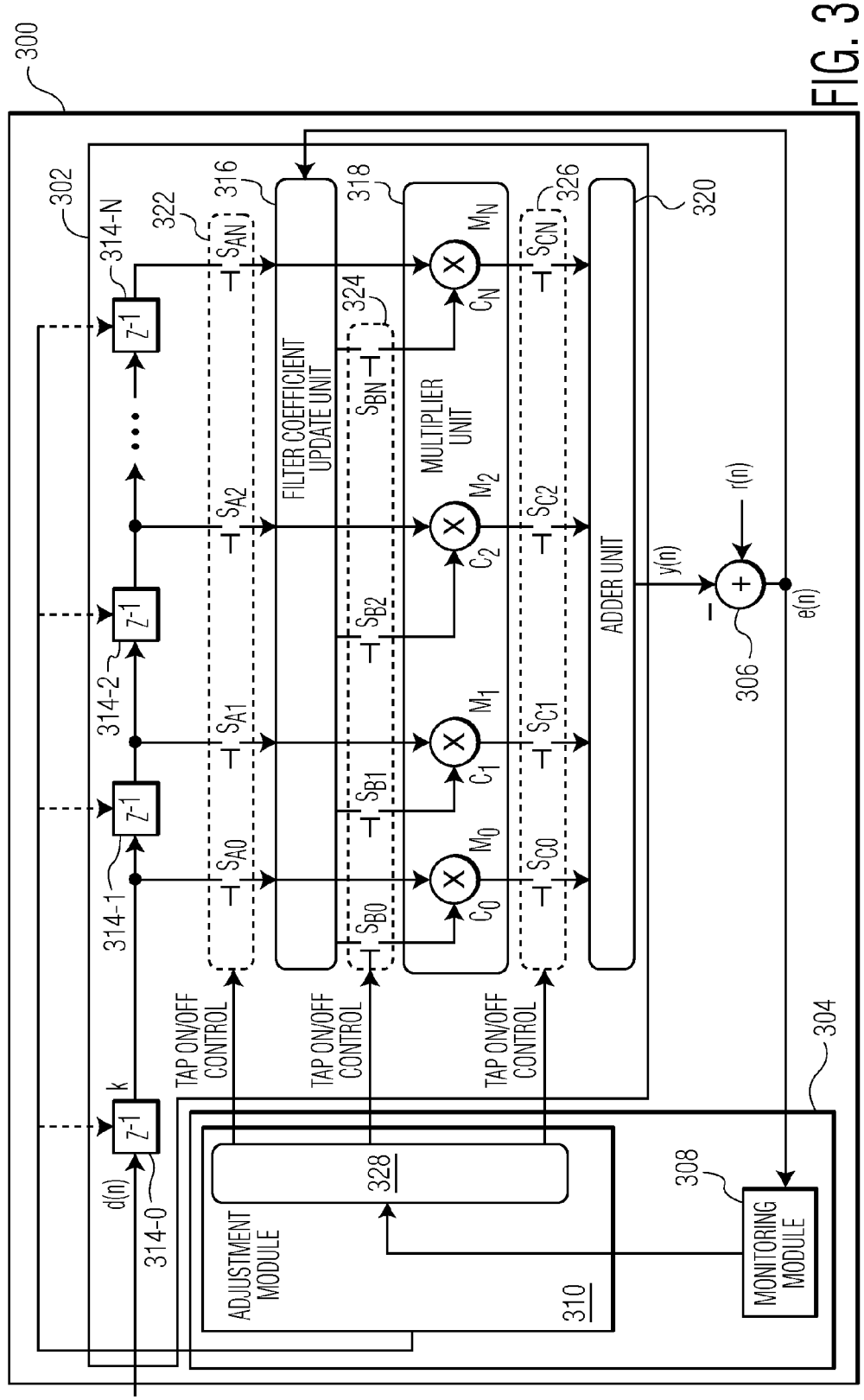
FIG. 3 depicts a second embodiment of the echo cancellation device depicted in FIG. 1.

FIGS. 2 and 3 depict two embodiments of the echo cancellation device 100 depicted in FIG. 1. Echo cancellation devices 200, 300 depicted in FIGS. 2 and 3 are merely two of the possible implementations of the echo cancellation device 100 depicted in FIG. 1. However, the echo cancellation device 100 depicted in FIG. 1 can be implemented differently from the echo cancellation devices 200, 300 depicted in FIGS. 2 and 3. The invention is not restricted to the particular implementation of the echo cancellation devices 200, 300 depicted in FIGS. 2 and 3.

FIG. 2 depicts an embodiment of the echo cancellation device 100 depicted in FIG. 1 where the channel impulse response is tuned by varying the delay elements 214-0 . . . 214-N (N is a positive integer) while keeping the filter taps unchanged. In the embodiment depicted in FIG. 2, the echo cancellation device 200 includes an adaptive filter 202, a filter control unit 204 and a signal subtractor 206. In an embodiment, if the impulse response of the communication channel changes from the nominal case to the worst case, the filter control unit 204 adjusts (increases or decreases) the number k, of delay elements 214 with a z-transform function, $Z^{-1}$, of the adaptive filter 202 that are enabled to the point where the echo cancelation error, e(n), is minimized. Herein, n represents the signal index, which is a non-negative integer. The echo cancellation error, e(n), is equal to the difference between the estimated echo, y(n), that is generated by the adaptive filter 202 and a received symbol, r(n). In this embodiment, if the impulse response of the channel changes from a nominal case to the best case, the filter control unit 204 decreases the number, k, of enabled delay elements 214 of the adaptive filter 202.

In the embodiment depicted in FIG. 2, the adaptive filter 202 is an N order filter that includes N+1 discrete delay elements 214-0 . . . 214-N, $Z^{-1}$, a filter coefficient update unit 216, a multiplier unit 218, and an adder unit 220. Each of the delay elements 214 is controlled by the adjustment module 210. Although the adaptive filter 202 is shown in FIG. 2 as including four delay elements 214, in some embodiments, the adaptive filter 202 includes more than or less than four delay elements 214. The adaptive filter 202 has N+1 filter coefficients, $C_0, C_1, C_2, \ldots, C_N$, and N+1 filter taps. The filter coefficient update unit 216 is configured to update the filter coefficients. In an embodiment, the filter coefficient update unit 216 updates the filter coefficients based on the echo cancelation error, e(n). The filter coefficient update unit can use different algorithms, such as least mean square (LMS) and recursive least square (RLS), to update the filter coefficients. The multiplier unit 218 is configured to multiply each filter coefficient with a corresponding delayed input symbol. In the embodiment depicted in FIG. 2, the multiplier unit 218 includes N+1 multipliers $M_0, M_1, M_2, \ldots, M_N$, and each of the multipliers multiplies a delayed input signal with a corresponding one of the filter coefficients, $C_0, C_1, C_2, \ldots, C_N$. The adder unit 220 is configured to add the multiplication products together to generate an estimated communication channel echo. The signal subtractor 206 subtracts the estimated echo, y(n), generated by the adaptive filter 202 from a received symbol, r(n), to generate an echo cancellation error, e(n). In the embodiment depicted in FIG. 2, the filter control unit 204 includes a monitoring module 208 that is configured to monitor, process and analyze the echo cancelation error, e(n), and an adjustment module 210 that is configured to enable or disable the delay elements 214 to a desired number, k, of operating delay elements. In an embodiment, the monitoring module 208 calculates a mean square error (MSE) of the echo cancelation error, e(n), and derives a desired number, k, of the delay elements 214 from the mean square error of the echo cancelation error, e(n).

In the echo cancellation device 200, the filter taps of the adaptive filter 202 are kept unchanged. As shown in FIG. 2, the connections between the delay elements 214-0 . . . 214-N, the corresponding multipliers, $M_0, M_1, M_2, \ldots, M_N$, of the multiplier unit 218, the filter coefficient update unit 216 and the adder unit 220 are not switchable. Consequently, the delayed input signals from all of the delay elements 214 are used to generate the output signal, y[n]. The output signal, y[n], and the input signal, d[n], of the adaptive filter 202 satisfy:

$$y[n] = \sum_{i=0}^{N} C_i \times d[n-i], \qquad (2)$$

where $C_i$ represents filter coefficients, N represents the filter order, and d[n−i] represents filter taps.

However, in some embodiments, the filter taps of an adaptive filter can be changed. FIG. 3 depicts an embodiment of the echo cancellation device 100 depicted in FIG. 1 where the delay elements 314 and filter taps are varied in order to fine tune the channel impulse response. In the embodiment depicted in FIG. 3, the echo cancellation device 300 includes an adaptive filter 302, a filter control unit 304 and a signal subtractor 306. The adaptive filter 302 is an N (N is a positive integer) order filter that includes N+1 discrete delay elements 314-0 . . . 314-N, with a z-transform function, $Z^{-1}$, a filter coefficient update unit 316, a multiplier unit 318, and an adder unit 320. The filter coefficient update unit 316, the multiplier unit 318 and the adder unit 320 performs similar or the same function as the filter coefficient update unit 216, the multiplier unit 218, and the adder unit 220, respectively. The adaptive filter 302 has N+1 filter coefficients, $C_0, C_1, C_2, \ldots, C_N$, and N+1 filter taps. The multiplier unit 318 includes N+1 multipliers $M_0, M_1, M_2, \ldots, M_N$, and each of the multipliers multiplies a delayed input signal with a corresponding one of the filter coefficients, $C_0, C_1, C_2, \ldots, C_N$. The signal subtractor 306 subtracts the estimated echo, y(n), generated by the adaptive filter 302 from a received symbol, r(n), to generate an echo cancellation error, e(n). Herein, n represents the signal index, which is a non-negative integer.

The filter control unit 304 of the echo cancellation device 300 includes a monitoring module 308 that is configured to monitor, process and analyze the echo cancelation error, e(n), and an adjustment module 310 that is configured to enable or disable at least one of the delay elements 314-0 . . . 314-N of the adaptive filter 302 to a desired number, k, and to turn on or turn off at least one of the filter taps of the adaptive filter 302. Turning on a filter tap of the adaptive filter 302 means including the corresponding version of the input signal, d[n], of the adaptive filter 302 in the output signal, y[n], of the adaptive filter 302. Turning off a filter tap of the adaptive filter 302 means excluding the corresponding version of the input signal, d[n], of the adaptive filter 302 in the output signal, y[n], of the adaptive filter 302. Turning on or turning off a filter tap of the adaptive filter 302 is also referred to selection or deselection of the filter tap.

In the embodiment depicted in FIG. 3, turning on or turning off the filter taps of the adaptive filter 302 are done by switching the connections between the delay elements 314-0 . . . 314-N, the corresponding multipliers, $M_0, M_1, M_2, \ldots, M_N$, of the multiplier unit 318, the filter coefficient update unit 316 and the adder unit 320. As shown in the dotted regions 322, 324, 326, switches $S_{A0}, S_{A1}, S_{A2}, \ldots, S_{CN}$ are used in the connections between the delay elements 314-0 . . . 314-N, the corresponding multipliers, $M_0, M_1, M_2, \ldots, M_N$, of the multiplier unit 318 and the adder unit 320. In particular, a group of switches $S_{A0}, S_{A1}, S_{A2}, \ldots, S_{AN}$ (in dotted region 322) are implemented in the connections between the delay elements 314-0 ... 314-N and the filter coefficient update unit 316, a group of switches $S_{B0}, S_{B1}, S_{B2}, \ldots, S_{BN}$ (in dotted region 324) are implemented in the connections between the filter coefficient update unit 316 and the multipliers, $M_0, M_1, M_2, \ldots, M_N$, of the multiplier unit 318, and a group of switches $S_{C0}, S_{C1}, S_{C2}, \ldots, S_{CN}$ (in dotted region 326) are implemented in the connections between the multipliers of the multiplier unit 318 and the adder unit 320. Although each group of the switches $S_{A0}, S_{A1}, S_{A2}, \ldots, S_{CN}$ is shown in FIG. 2 as including four switches, in some embodiments, each group of the switches includes more than or less than four switches. In addition, although the switches $S_{A0}, S_{A1}, S_{A2}, \ldots, S_{CN}$ are shown in FIG. 2 as including three groups of switches, in some embodiments, the switches includes more than or less than three groups of switches.

The switches $S_{A0}, S_{A1}, S_{A2}, \ldots, S_{CN}$ are divided into switch sets according to the connections that the switches are located in. For example, the switches $S_{A0}, S_{B0}, S_{C0}$ form a switch set that controls the connection between the delay element 314-0 and the adder unit 320, the switches $S_{A1}, S_{B1}, S_{C1}$ form a switch set that controls the connection between the delay element 314-1 and the adder unit 320, the switches $S_{A2}, S_{B2}, S_{C2}$ form a switch set that controls the connection between the delay element 314-2 and the adder unit 320, and the switches $S_{AN}, S_{BN}, S_{CN}$ form a switch set that controls the connection between the delay element 314-N and the adder unit 320. The switches in each of the switch sets are switched on or off simultaneously. The adjustment module 310 includes a switching unit 328 that turns on or off at least one particular switch set of the adaptive filter 302. Switching on a particular switch set using the switching unit 328 causes the corresponding version of the input signal, d[n], of the adaptive filter 302 to be included in the output signal, y[n], of the adaptive filter. Switching off a particular switch set using the switching unit 328 causes the corresponding version of the input signal, d[n], of the adaptive filter 302 to be excluded from the output signal, y[n], of the adaptive filter. For example, when the set of switches $S_{A0}, S_{B0}, S_{C0}$, which controls the connection between the delay element 314-0 and the adder unit 320, is switched on, the delayed input signal from the delay element 314-0 is included in the output signal, y[n], of the adaptive filter 302. When the set of switches $S_{A0}, S_{B0}, S_{C0}$, which controls the connection between the delay element 314-0 and the adder unit 320, is switched off, the delayed input signal from the delay element 314-0 is excluded from the output signal, y[n], of the adaptive filter 302. The output signal, y[n], and the input signal, d[n], of the adaptive filter 302 satisfy:

$$y[n] = \sum_{i=0}^{N} S_i \times C_i \times d[n-i], \quad (3)$$

where N represents the filter order, d[n−i] represents filter taps, $C_i$ represents filter coefficients, and $S_i$ represents the switching status of the corresponding switch set. $S_i$ is equal to zero if the corresponding switch set is switched off by the switching unit and one if the corresponding switch set is switched on by the switching unit.

In an embodiment, the monitoring module 308 calculates a mean square error (MSE) of the echo cancelation error, e(n), and derives a desired number, k, of the enabled delay elements 314 and a desired number of connected filter taps from the mean square error of the echo cancelation error, e(n). In an embodiment, the adjustment of the filter taps is done by monitoring the filter coefficient. If the value of a filter coefficient is below (i.e., smaller than) a certain threshold, the corresponding filter tap is turned off by switching off the corresponding set of switches. If the value of a filter coefficient is above a certain threshold, the corresponding filter tap is kept on by switching on the corresponding set of switches. The threshold can be determined empirically or theoretically.

Figure 4:
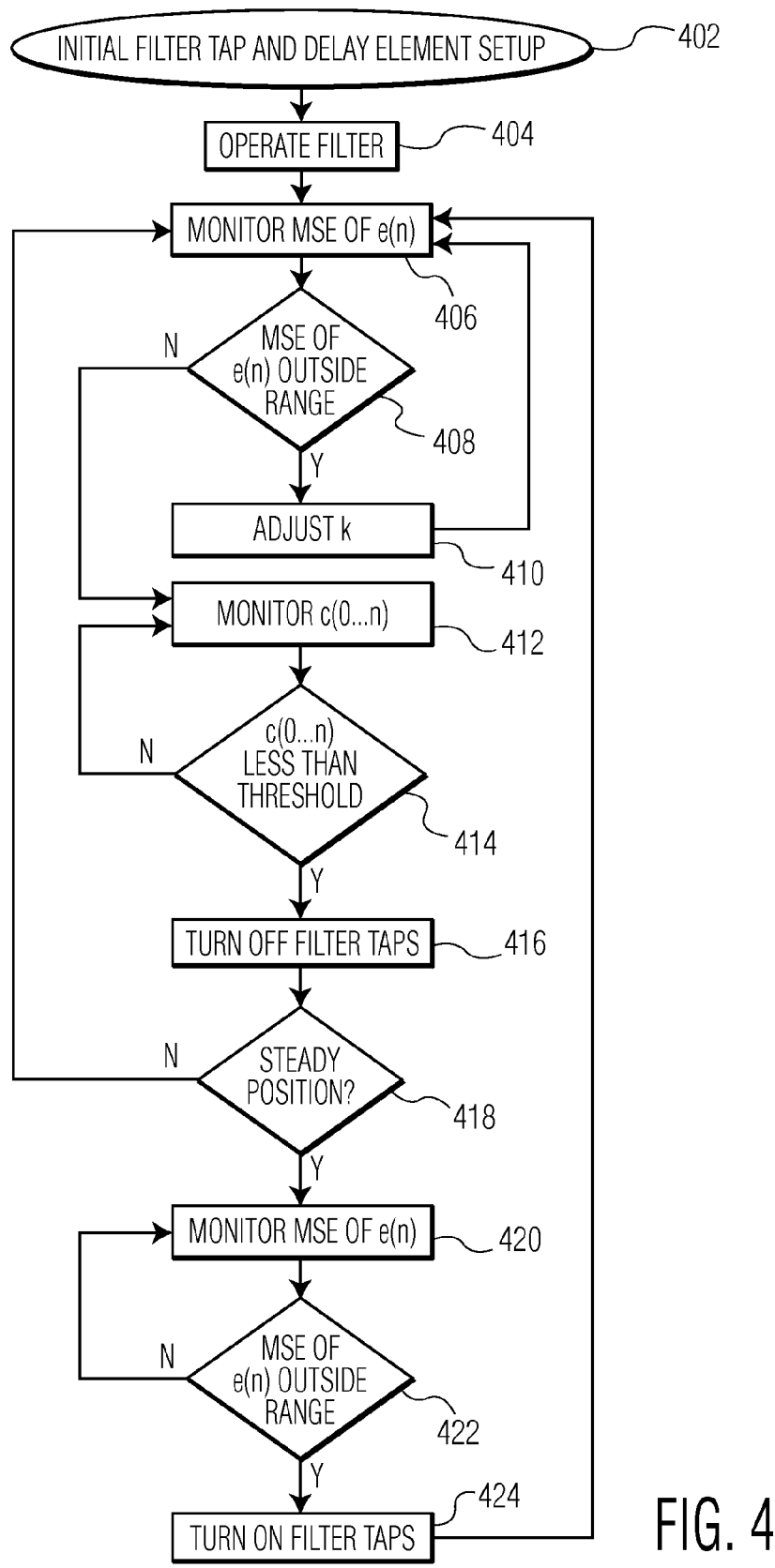
FIG. 4 is a flow chart that illustrates an exemplary operation of the echo cancellation device depicted in FIG. 3.

FIG. 4 is a flow chart that illustrates an exemplary operation of the echo cancellation device 300 depicted in FIG. 3. In the exemplary operation, the delay elements 314 are adjusted first and the filter taps are adjusted later, in order to reduce the power consumption of the adaptive filter 302.

At step 402, the filter control unit 304 performs an initial filter setup by keeping all the FIR filter taps on and keeping the delay elements 314 to its minimum possible value. After the initial setup, the adaptive filter 302 begins operation, at step 404. The filter control unit 304 monitors the mean square error (MSE) of the echo cancelation error, e(n), at step 406 and checks whether or not the mean square error (MSE) of the echo cancelation error, e(n), is outside a predefined range, at step 408. If the mean square error (MSE) of the echo cancelation error, e(n), falls outside the predefined range, the filter control unit 304 adjusts (increases or decreases) the number, k, of operating delay elements, at step 410 and continues to monitor the mean square error (MSE) of the echo cancelation error, e(n).

If the mean square error (MSE) of the echo cancelation error, e(n), falls within the predefined range, the number, k, of enabled delay elements 314 is assumed to be correct and the filter control unit 304 monitors the filter coefficients, $C_0, C_1, C_2, \ldots, C_N$, of the adaptive filter 302, at step 412, and checks whether or not the filter coefficients, $C_0, C_1, C_2, \ldots, C_N$, are less than the corresponding predefined thresholds, at step 414. If one of the filter coefficients, $C_0, C_1, C_2, \ldots, C_N$, is larger than the corresponding predefined threshold, the filter control unit 304 continues to monitor the filter coefficients, $C_0, C_1, C_2, \ldots, C_N$. If one of the filter coefficients, $C_0, C_1, C_2, \ldots, C_N$, is smaller than the corresponding predefined threshold, the filter control unit 304 turns off the corresponding filter tap, at step 416.

After fine tuning of the delay elements 314 and filter taps, the filter control unit 304 checks whether or not the adaptive filter 302 reaches its steady state position, at step 418. If the adaptive filter 302 does not reach its steady state position, the filter control unit 304 continues to monitor the mean square error (MSE) of the echo cancelation error, e(n)," and the filter coefficients, $C_0, C_1, C_2, \ldots, C_N$. If the adaptive filter 302 reaches its steady state position, the filter control unit 304 continues to monitor the mean square error (MSE) of the echo cancelation error, e(n), at step 420, and checks whether or not the mean square error (MSE) of the echo cancelation error, e(n), is outside a predefined range, at step 422. If the mean square error (MSE) of the echo cancelation error, e(n), falls within the predefined range, the filter control unit 304 continues to monitor the mean square error (MSE) of the echo cancelation error, e(n). If the mean square error (MSE) of the echo cancelation error, e(n), falls outside the predefined range, the filter control unit 304 first turns on all of the filter taps, at step 424, and continues to monitor the mean square error (MSE) of the echo cancelation error, e(n), at step 406.

Figure 5:
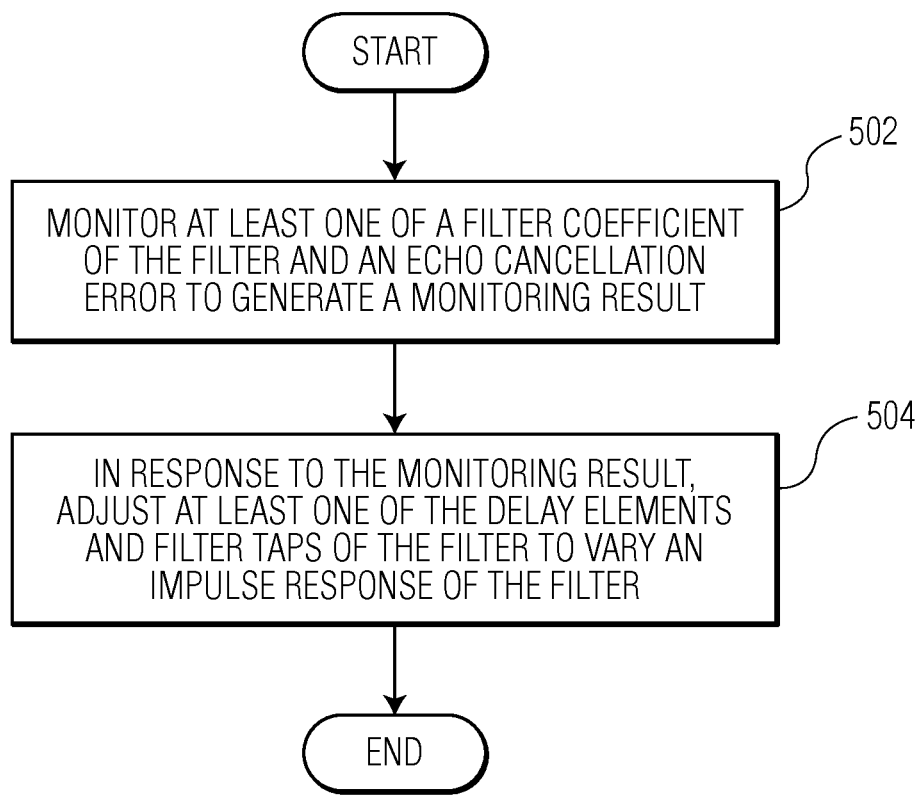
FIG. 5 is a process flow diagram of a method for operating a filter for echo cancellation in accordance with an embodiment of the invention.

FIG. 5 is a process flow diagram of a method for operating a filter for echo cancellation in accordance with an embodiment of the invention. The filter may be similar to or same as the adaptive filter 104, 204, 304 depicted in FIG. 1, 2 or 3. At block 502, at least one of a filter coefficient of the filter and an echo cancellation error is monitored to generate a monitoring result. At block 504, in response to the monitoring result, at least one of delay elements and filter taps of the filter is adjusted to vary an impulse response of the filter The various components or units of the embodiments that have been described or depicted (e.g., the filter control units 104, 204, 304, the monitoring modules 108, 208, 308, the adjustment modules 110, 210, 310) may be implemented in hardware, software that is stored in a non-transitory computer readable medium or a combination of hardware and software that is stored in a non-transitory computer readable medium. The non-transitory computer readable medium can be an electronic, magnetic, optical, electromagnetic, infrared, or semiconductor system (or apparatus or device), or a propagation medium. Examples of a non-transitory computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), and a Blu-ray disk. Furthermore, the various components or units of the embodiments (e.g., the filter control units 104, 204, 304, the monitoring modules 108, 208, 308, the adjustment modules 110, 210, 310) that have been described or depicted may be implemented in a processor, which may include a multifunction processor and/or an application-specific processor.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for operating a filter for echo cancellation, the method comprising:
    estimating a communication channel echo using the filter;
    calculating an echo cancellation error as the difference between the estimated communication channel echo and an input signal received at the filter;
    monitoring at least one of a filter coefficient of the filter and the echo cancellation error to generate a monitoring result; and
    in response to the monitoring result, adjusting at least one of delay elements and filter taps of the filter to vary an impulse response of the filter by simultaneously turning on or turning off a set of switches including a first set of switches and a second set of switches, where the first set of switches controls a connection between a delay element of the filter and a corresponding multiplier of the filter and the second set of switches controls a connection between the corresponding multiplier and a corresponding adder unit of the filter.

2. The method of claim 1, wherein monitoring the at least one of the filter coefficient of the filter and the echo cancellation error comprises comparing the echo cancellation error with a predefined range.

3. The method of claim 2, wherein adjusting the at least one of the delay elements and the filter taps of the filter comprises enabling at least one of the delay elements if the echo cancellation error falls outside of the predefined range.

4. The method of claim 2, wherein adjusting the at least one of the delay elements and the filter taps of the filter comprises enabling at least one of the delay elements only if the echo cancellation error falls outside of the predefined range.

5. The method of claim 1, wherein monitoring the at least one of the filter coefficient of the filter and the echo cancellation error comprises comparing the filter coefficient of the filter with a predefined threshold.

6. The method of claim 5, wherein adjusting the at least one of the delay elements and the filter taps of the filter comprises if the filter coefficient is smaller than the predefined threshold, turning off a corresponding one of the filter taps.

7. The method of claim 6, wherein adjusting the at least one of the delay elements and the filter taps of the filter comprises if the filter coefficient is larger than the predefined threshold, turning on or keeping on the corresponding one of the filter taps.

8. The method of claim 1, wherein monitoring the at least one of the filter coefficient of the filter and the echo cancellation error comprises comparing all of the filter coefficients of the filter with predefined thresholds.

9. The method of claim 8, wherein adjusting the at least one of the delay elements and the filter taps of the filter comprises:
    if one of the filter coefficients is smaller than a particular predefined threshold, turning off a corresponding filter tap; and
    if the one of the filter coefficients is smaller than the particular predefined threshold, turning on or keeping on the corresponding filter tap.

10. The method of claim 1, wherein the filter is a finite impulse response (FIR) filter.

11. The method of claim 1, wherein the filter is a part of a serial communication device.

12. The method of claim 1, wherein monitoring the at least one of the filter coefficient of the filter and the echo cancellation error comprises comparing a mean square error of the echo cancelation error with a predefined range, and wherein adjusting the at least one of the delay elements and the filter taps of the filter comprises enabling at least one of the delay elements if the mean square error of the echo cancellation error falls outside of the predefined range.

13. A system for operating a filter for echo cancellation, the system comprising:
    at least one delay element;
    a set of switches including a first set of switches and a second set of switches;
    a multiplier unit connected to the at least one delay element via the first set of switches;
    an adder unit connected to the multiplier unit via the second set of switches;
    a monitoring module configured to monitor at least one of a filter coefficient of the filter and an echo cancellation error to generate a monitoring result, wherein the echo cancellation error is calculated as the difference between an estimated communication channel echo and an input signal received at the filter; and
    an adjustment module configured to, in response to the monitoring result, adjust at least one of delay elements and filter taps of the filter to vary an impulse response of the filter by simultaneously turning on or turning off the set of switches, where the first set of switches controls a connection between the at least one delay element of the filter and the multiplier unit of the filter and the second set of switches controls a connection between the multiplier unit and the adder unit of the filter.

14. The system of claim 13, wherein the adjustment module is further configured to enable at least one of the delay elements if the echo cancellation error falls outside of a predefined range.

15. The system of claim 13, wherein the adjustment module is further configured to turning off a corresponding one of the filter taps if the filter coefficient is smaller than a predefined threshold.

16. A serial communication device comprising the system of claim 13.

17. A Universal Serial Bus (USB) device or an Ethernet device comprising the system of claim 13.

18. A method for operating a filter of a serial communication device for echo cancellation, the method comprising:

estimating a communication channel echo using the filter;

calculating an echo cancellation error as the difference between the estimated communication channel echo and an input signal received at the filter;

comparing the echo cancellation error of the serial communication device with a predefined range;

enabling at least one delay element of the filter if the echo cancellation error falls outside of the predefined range by simultaneously turning on a set of switches including a first set of switches and a second set of switches, where the first set of switches controls a connection between the at least one delay element of the filter and a corresponding multiplier of the filter and the second set of switches controls a connection between the corresponding multiplier and a corresponding adder unit of the filter;

comparing a filter coefficient of the filter with a predefined threshold; and if the filter coefficient is smaller than the predefined threshold, turning off a filter tap of the filter.

19. The method of claim 18, wherein the serial communication device is a Universal Serial Bus (USB) device or an Ethernet device.

* * * * *